May 9, 1961  C. P. SPIER ET AL  2,983,004
MANUFACTURE OF CORE FORMS
Filed Jan. 19, 1959  4 Sheets-Sheet 1

INVENTORS:
CARL P. SPIER
PAUL W. WAGNER
BY
Curtis, Morris & Safford
ATTORNEYS:

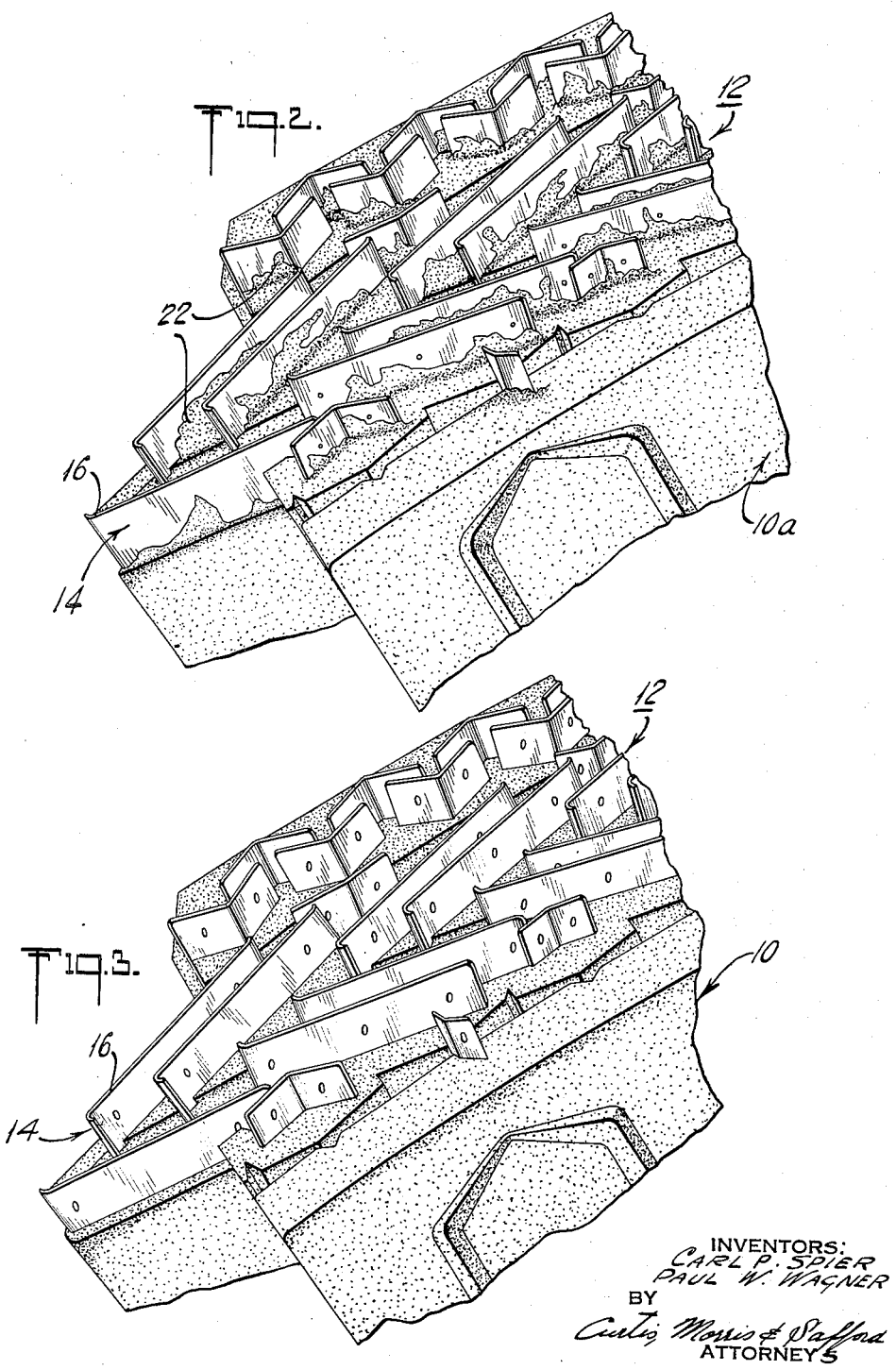

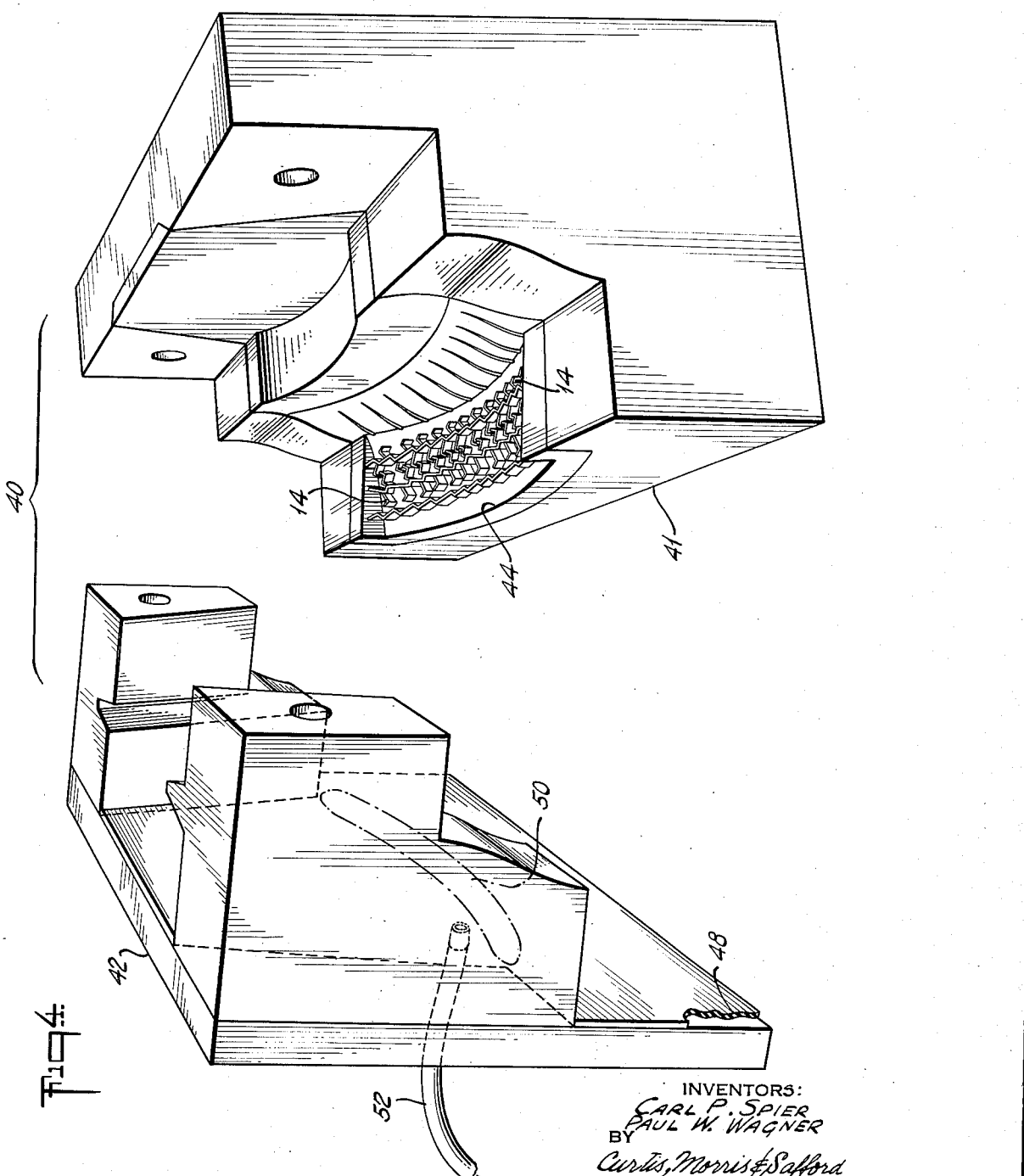

May 9, 1961    C. P. SPIER ET AL    2,983,004
MANUFACTURE OF CORE FORMS
Filed Jan. 19, 1959    4 Sheets-Sheet 4
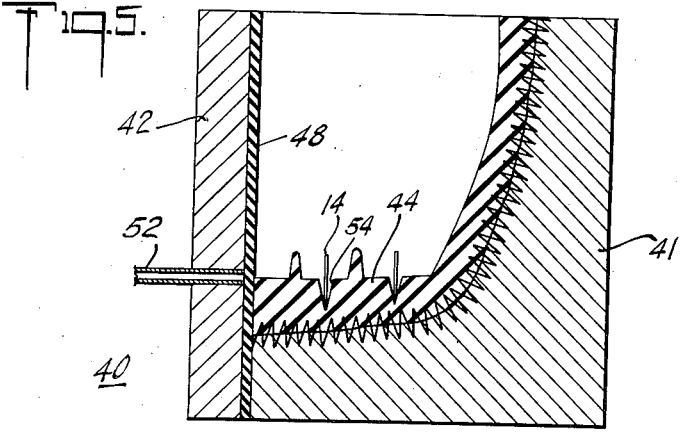
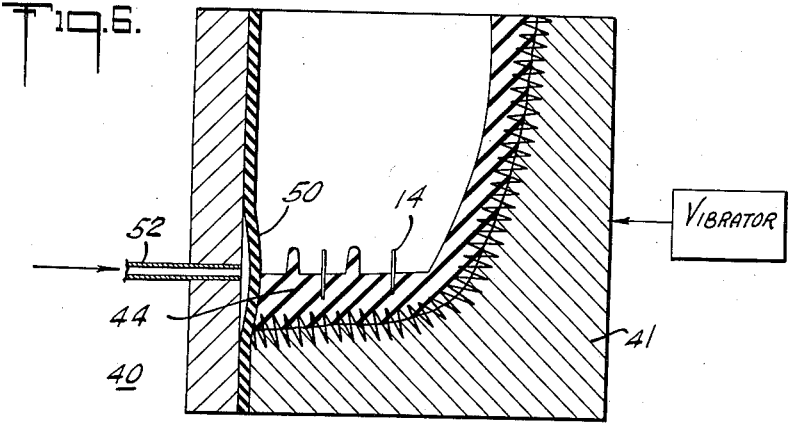
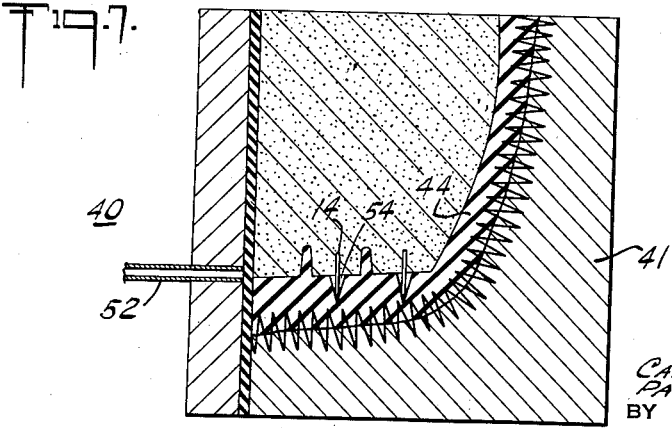
INVENTORS:
CARL P. SPIER
PAUL W. WAGNER
BY
Curtis, Morris & Safford
ATTORNEYS

United States Patent Office 2,983,004
Patented May 9, 1961

2,983,004

MANUFACTURE OF CORE FORMS

Carl P. Spier and Paul W. Wagner, Yellow Springs, Ohio, assignors to Morris Bean and Company, Yellow Springs, Ohio, a corporation of Ohio Filed Jan. 19, 1959, Ser. No. 787,679

6 Claims. (Cl. 22—158)

This invention relates to an improved method of making molds, core forms, patterns and the like by pouring a fluent settable material onto a resiliently flexible form. The invention is particularly applicable for making a plaster mold carrying an intricate array of sheet metal inserts in its face and which are to be transferred to a metal casting made to the plaster mold. More particularly the invention is useful in connection with the manufacture of cast metal automobile tire molds having Sipe inserts for slitting the tread of a tire.

Many tire manufacturers nowadays provide in the treads of their tires numerous slits which give square edges to act as squeegees against road surfaces and thereby give the tires better traction, especially on slippery or wet roads. These slits as first used by Mr. Sipe were made by cutting the tread rubber, but now generally are formed in the tire during manufacture by very thin metal blades, called "Sipes," which project from the face of the tire molds. Formerly these Sipes were mechanically driven into the face of the tire mold; but recently, such huge numbers of these Sipes have been used, arranged so closely spaced and in such intricate designs that it has been necessary to incorporate them in the tire mold when it is cast.

A way of doing this is to drive, or force fit, the blades into the rigid plaster mold allowing that portion of them, which is to be anchored in the metal tire mold casting, to protrude from the plaster mold. Then when the metal is cast over this mold the blades are anchored in the casting. This method has the disadvantages of being expensive and time consuming. Also, some blades, because of their heavy thickness or intricate design, cannot be inserted without breaking the plaster mold surface.

Another way of getting blades into the metal tire mold is to first set them into slots in the flexible pattern and then pour a slurry mold material in around them. This method is described and claimed in U.S. Patent No. 2,263,001. In this method it is necessary to form slots in the flexible patterns or tire forms and fit the Sipes into these slots before pouring the mold plaster over the pattern. But these many slots so cut up the pattern that the pattern material no longer has the strength to grip the Sipes tightly enough to keep out the plaster.

Additionally, long and deep cuts weaken the flexible pattern material because stresses are localized rather than being spread throughout the mass. In addition, some flexible materials, including Korogel, are subject to distortion as they age due to loss or gain of plasticizing agents. These distortions tend to localize at corners, cuts, and slots because of the large amount of exposed surface relative to the mass.

The slot weakened patterns permit easy movement of the blades which creates openings between the blades and pattern material for the plaster to enter. Blades fit poorly in distorted slots and there may be space around a part of the blade for the plaster to make its entrance. The present invention provides a solution to this problem.

Typically in making a cast metal tire mold, a full size model is made of the portion of the tire which is to be reproduced by the mold. On this model, in turn, there is molded a resilient plastic material, e.g., a vinyl chloride gel elastomer such as Korogel, for use as a pattern for the plaster casting mold. This resilient material is advantageously applied to the model in a liquid or syrupy state and is set to a tough rubbery material having an exact impression of the model. The resulting pattern is stripped from the model and advantageously is invested by a rigid support as described and claimed in the Bean U.S. Patent No. 2,402,528. Thereafter a suitable mold material, such as plaster of Paris, is poured into a cavity defined by this "negative" pattern and its investment and cooperating mold parts and is allowed to harden into an exact replica of the tire. This plaster cast then forms the "positive" casting mold or the core onto which molten metal such as aluminum is poured to form a "negative" tire mold casting. A new plaster core must be used for each tire mold thus cast and so it is important from the standpoint of cost that each plaster core be perfect as cast, or nearly so, without need for substantial hand work such as cleaning, finishing or removing of imperfections by highly skilled workmen.

Where Sipes are used, the resilient pattern is formed with slits into which the roots of these Sipes are fitted in proper array and held by the resilient grip of the pattern material.

Previous to this invention the Sipes have not always fitted perfectly in their respective slots, and the forces incidental to pouring, e.g., inertia of the poured plaster slurry, or any brushing which was done to release bubbles trapped in corners of the pattern has tended to move the Sipes to open cracks between them and the resilient pattern material around their roots. When this occurs, some of the plaster runs down into these cracks along the roots of the blades. This plaster "flash," if left on the Sipes, afterward prevents the tire mold metal cast around them from bonding and holding them securely, so that in use the Sipes pull out from the tire mold and may remain in a tire tread.

Conversely, where a thicker plaster slurry was used in an attempt to control this "flash" around the roots of the Sipes, the plaster failed to conform perfectly and completely to the detail of the flexible pattern or to release and displace air bubbles. Generally, therefore, in either case it has been found necessary to clean off or finish a plaster core and its projecting Sipes by hand work after the mold has been stripped from the flexible pattern. Such hand work is tedious and expensive.

The present invention effectively eliminates this problem and makes possible the production of substantially perfect plaster molds of this kind in which there is virtually no "flash" of plaster on the root portions of the Sipes.

In accordance with the present invention, a plaster mold is made by taking a flexible negative pattern having slits in its face to receive Sipes, inserting the Sipes into these slits, then applying externally pressure to the flexible pattern to tightly close each slit by compressing the pattern material around the root portions of the blades. Thereafter, liquid plaster slurry is poured into the cavity over this compressed pattern and around the Sipes and allowed to set. Before the slurry has set and while pressure is maintained on the flexible pattern material the pattern and/or slurry may be agitated to allow entrained air bubbles and trapped air, which may have collected on the surface of the pattern, to be released from the pattern surface and float to the top of the slurry. These air bubbles would otherwise prevent the slurry from making a perfect and true reproduction of the pattern surface.

In order to minimize reproduction in the plaster core of distortion of the flexible negative pattern caused by the external pressure on it, the plaster may be allowed to thicken only just enough to prevent its flowing into the slits around the Sipes, and then releasing the pressure and allowing the still soft plaster to follow the pattern surface as it recovers from such distortion. Thereafter, the plaster is left to harden completely. The finished plaster pattern made in this fashion is very nearly perfect in detail without later patching or hand finishing.

The invention utilizes the principle that the flexible pattern material will behave as an incompressible solid. Thus, pressure applied to part of it will cause it to flow. Since it is resilient, releasing the pressure will permit its return to the original configuration. Cuts and slots in a flexible pattern can be caused to close by applying pressure to the proper points and they will reopen upon pressure release.

To make use of these facts, pressure is applied to the flexible pattern after the blades have been inserted in the pattern but before the slurry is poured. The pressure forces the slots to close around the blades and hold them firmly. This closing provides a seal around the blades to prevent the entrance of the slurry into the slots during pouring and agitation. In addition, the blades will not be moved out of position by the agitation because they are tightly gripped by the pattern.

The pressure is maintained on the pattern through the pouring and agitation of the slurry and through part of its setting period. The pressure is then released and the pattern returns to its natural contour. The time at which the pressure is released must be selected so that the mix has become too thick to flow into small openings between blades and blade slots. However, the mix must still be fluid enough to flow with the pattern when it returns to its natural contours and must not restrain this return. After the pressure is released the plaster continues to set until hard enough to be removed from the pattern. Since the pattern no longer tightly grips the blades, the plaster mold can easily be removed from the pattern in the usual way, leaving the blades embedded in the plaster mold.

This procedure produces plaster molds which require little or no retouching because the blades are sealed in the slots and are kept clean of the plaster slurry, the blades have been held in proper position, and the agitation or vibration of the mold has been sufficient to dislodge the air from the pattern surface and cause the plaster to flow into all corners.

Pressure may be applied to the flexible pattern material by several methods. The most satisfactory method found so far, and at present our preferred method, is illustrated in the accompanying drawings.

A better understanding of the invention together with a fuller appreciation of its many advantages will be gained from the following description given in connection with the accompanying drawings wherein:

Figure 2 is an enlarged view of a portion of such a mold segment made according to the prior art and showing plaster "flash" on the Sipes.

Figure 3 is a similar view of a plaster mold segment made according to the invention, showing the absence of "flash."

Figure 4 is a perspective view of an open pattern set for casting a plaster core or casting mold according to the invention and within which is mounted a flexible negative pattern of a segment of the tread portion of a tire, this pattern having Sipes inserted into it.

Figure 5 is a cross-section view, on somewhat smaller scale, of the invested pattern and cooperating mold parts just after closing together, and illustrates in exaggerated detail the cracks or slots which open between the flexible negative pattern and the inserted blades.

Figure 6 is a view similar to Figure 5 but showing these cracks closed by the application of pressure on a portion of the flexible pattern; and Figure 7 is a view similar to Figure 6 but showing the flexible pattern after the plaster has been poured into it and the pressure on the flexible pattern released.

Figure 1:
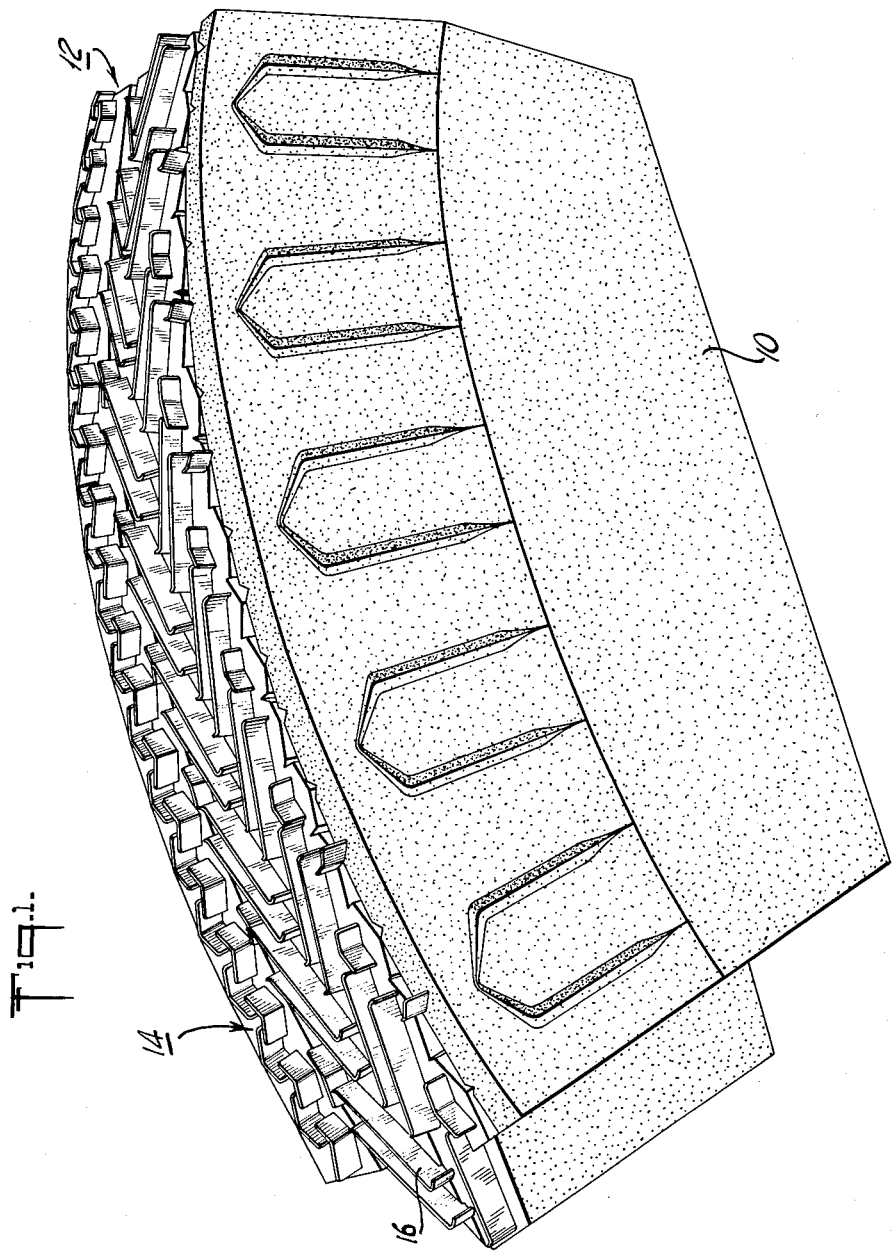
Figure 1 is a perspective view of a plaster mold segment for use in casting a tire mold with Sipes.

The plaster mold segment 10, shown in Figure 1, comprises one portion, for example, of a positive replica of a full size passenger car tire. This segment of a casting mold, may be made of plaster of Paris, or the equivalent, and has a tread portion 12 in which are embedded thin sheet metal Sipes, generally indicated at 14, for forming narrow grooves or slits in the tire tread.

The root portions of these Sipes project from the mold segment so as to be embedded in, and anchored by, metal cast over this mold. This segment, as was explained above, is to be used as a portion of a mold for casting a metal tire mold. After the metal tire mold has been cast onto this mold segment, the latter is broken away and the upper ends 16 of the Sipes remain firmly anchored in the metal of the tire mold, their lower ends, which in Figure 1 are shown embedded in the plaster segment, then projecting out from the inner face of the mold. It is important in order for the metal mold to be perfectly formed and for the blades to remain firmly anchored in it, that segment 10 be exactly and fully formed and especially that the Sipes 14 be clean and free of plaster "flash."

Figure 2 shows in enlarged detail a portion of a typical plaster segment mold 10a, as made in accordance with previously known techniques. As can be seen, the Sipes are partly covered by plaster "flash" 22 in the regions 16. This material, as was mentioned, must be cleaned off before the segment mold can be used to make a first quality tire mold. Because the blades are so closely spaced and because they can easily be broken out of the tire mold, this cleaning operation must be carefully done and it is time consuming.

The problem cannot be solved by pouring the plaster in a less liquid condition as the property of flowing accurately into all details of the mold and especially into the very apex of all corners, is an important property of the mold plaster.

Figure 3 is similar to Figure 2 but shows, in accurate scale drawing, a portion of a segment mold 10 made by means of this invention. Here the exposed root ends of the Sipes remain clean and free of "flash" so that no scraping, chipping or other finishing is necessary to remove "flash." The tread portion of the mold is sharply defined and does not require filling in or building up. Thus, the mold segment and its blades are ready for use substantially as taken from the pattern. This constitutes an important saving in the cost of producing an end product, for example, a cast aluminum tire mold.

Figure 4 shows a pattern set 40 for making plaster mold segments according to the invention. This pattern set comprises a rigid drag 41 and cope 42 shaped as shown and which fit together to provide a cavity into which liquid plaster can be poured. On the interior of drag 41 is a flexible resilient pattern layer 44, of vinyl chlorid-plastisol gel (Korogel) or other resiliently flexible pattern material. This pattern carries the negative impression of the article to be formed, in this case a segment of the outer portion of a tire. Fitted into slits in the tread portion of layer 44 are a multitude of closely spaced Sipes 14 inserted into close-fitting slots in the resilient layer 44. The embedded portions of these blades correspond to the exposed portions 16 of blades 14 in Figure 1.

Cope 42 has a flat vertical face adapted to form the back of the mold cavity over the pattern. On this face, and bonded thereto, except in an area which is to be inflated as hereinafter explained, is a thin rubber diaphragm 48, which may have a flat ground face and which as seen here in Figure 4 and in Figure 6, has a central unbonded portion 50 opposite pattern layer 44 which can be ballooned outward to press against the layer. The cover 42 behind portion 50 is arranged to be supplied with fluid pressure through a tube 52 controlled by a valve (not shown).

Figure 5 shows a cross-section view of pattern set 40 closed together and prior to filling with the plaster. Diaphragm 48 is relaxed on the back 42. The slits 54, which in this condition would hold the Sipes 14 more or less snugly, are shown pushed back from the Sipes as would occur when the plaster slurry works down beside them. This is shown somewhat exaggerated.

Figure 6 shows the pattern set as it actually is after diaphragm 48 has been inflated at 50 compressing the resilient material of layer 44 laterally against the sides of Sipes 14. All cracks between pattern layer 44 and Sipes 14 are now tightly closed, regardless of the angular relationship between the slots and the pushing force. In this condition, relatively thin liquid plaster can be poured into the cavity and will be kept out of the slots; no "flash" can form around the blades. The blades are tightly held by the presurized pattern layer even against the inertial forces of pouring the plaster around them, and the forces of subsequent agitation, vibration or brushing to remove bubbles, etc.

In one specific example of the manufacture of plaster segments in this fashion, the pattern set was prepared as shown in Figure 6. Then a thin slurry mixture was poured into the cavity while air pressure was admitted through pipe 52 to the balloon area or blister 50, to compress the pattern tightly against the Sipes. This mixture consisted of the following ingredients:

|  | Parts by weight |
|---|---|
| Plaster | 41 |
| Sand | 46 |
| Terra alba | 4 |
| Talc | 8 |
| Asbestos | 1 |
| Total dry ingredients | 100 |
| Water (at 110° F.) | 54 |

The pouring required about 6 seconds to fill the cavity. Then the pattern was mechanically vibrated for about 2 seconds to release and bring upward any air bubbles. Fairly vigorous vibration can be applied without disarranging the Sipe blades because at this time they are being rather tightly squeezed by the flexible pattern layer under pressure from the blister 50. About 20 seconds after this vibration was stopped, diaphragm 48 was deflated and vacuum connected through pipe 52; e.g., —5 p.s.i. guage. This permits the flexible pattern layer and blades to return to the position shown in Figure 7, the vacuum pulling back the diaphragm 48 even if made of a relatively sluggish material such as butyl rubber. If a more live rubber is used, vacuum is not essential. Butyl rubber is better where it is in contact with Korogel as it resists the plasticizer. The plaster is still sufficiently soft at this time to permit it to follow the surface of the resilient faces 48 and 44, but is already stiff enough so that it will not seep down into slits 54.

After about 7 minutes, setting is sufficiently advanced that the hardened segment can be removed from the pattern. The Sipe blades easily pull free from the flexible material of which this pattern is made.

These times of course are peculiar to the rapid setting mold plaster used. Whatever the particular mold composition, it is important that the pattern be squeezed tight against the Sipes when the liquid composition is poured, and that the pressure is released before the mold material sets, so that it will set in the undistorted form of the pattern. Advantageously the mold material has thickened sufficiently to avoid running down into slots 54 before the squeezing is released but the material is still capable of more massive flow to follow the pattern surface.

The above description of the invention is intended in illustration and to so instruct others skilled in this art that they will be enabled to modify and select alternatives best suited to each particular use. Thus, the invention can be used for purposes other than the manufacture of tire molds; also, various changes or modifications of the invention as specifically described may occur to those skilled in the art and these can be made without departing from the spirit or scope of the invention as set forth. For example, we may provide a hollow in the resilient liner 44 at the edge of the tread portion and pressure connections by which it may be inflated to crowd the resilient material toward the back 42 and thus tightly grip the Sipes. Or we may use mechanical means to press the resilient material.

We claim:

1. An improved method of making a mold part having inserts projecting from a face thereof comprising the steps of taking a flexible negative pattern of the mold mounted in a supporting body, rooting the inserts in slits in the pattern in a desired configuration, pressing said pattern within said body to squeeze it against said inserts, pouring liquid plaster or like material onto said pattern and allowing said material to harden, and thereafter releasing said pressure and removing said part whereby said inserts are freely removed from said pattern and are substantially free of "flash."

2. The method as in claim 1 wherein said material after it has been poured is agitated or vibrated for a short time and then let stand to harden.

3. The method as in claim 1 wherein after said material has been poured and allowed to harden slightly, the pressure on said flexible pattern is relaxed, and then said material is allowed to harden completely.

4. Apparatus for making a plaster mold part having thin blade-like inserts projecting from its face, comprising a pattern-set having a support body and a lining of a flexible negative pattern material with a plurality of slits in its face, said pattern material defining a hollow cavity into which liquid plaster can be poured and let harden, pressure means for squeezing a portion of said flexible pattern having said inserts during and after pouring of said plaster, said pressure means including a fluid chamber adjacent said negative pattern, and fluid supply means to expand said chamber to squeeze said pattern laterally and close said slits about said inserts, and means to vibrate said pattern-set after said plaster has been poured.

5. An improved method of making a plaster mold tire for casting metal molds which have Sipes projecting from a tread face thereon, said Sipes being substantially free of plaster "flash," comprising the steps of making a flexible resilient negative pattern of a tire and mounting it within a support, providing its tread portion with slits therein, mounting said Sipes in said slits, pressing said flexible pattern within the support to close said slits against said Sipes, pouring a liquid plaster slurry into said squeezed pattern, allowing the plaster to harden at least somewhat, and then releasing the pressure on said pattern.

6. The method as in claim 5 wherein the pressure on said pattern is released before said plaster has fully hardened and then it is allowed to harden completely, whereby said Sipes and pattern can assume an at-rest configuration and said plaster will not seep into said slits.

References Cited in the file of this patent

UNITED STATES PATENTS

| 2,263,001 | Gunsaulus | Nov. 18, 1941 |
| 2,448,640 | Weston | Sept. 7, 1948 |
| 2,658,237 | Cuppett | Nov. 10, 1953 |
| 2,708,776 | Heintz | May 24, 1955 |